(12) United States Patent
Williams et al.

(10) Patent No.: US 10,934,980 B2
(45) Date of Patent: Mar. 2, 2021

(54) SPACE OPTIMIZING AIR FILTER

(71) Applicant: K&N Engineering, Inc., Riverside, CA (US)

(72) Inventors: Steve Williams, Beaumont, CA (US); Jere James Wall, Helendale, CA (US); Jonathan Richard Fiello, Yucaipa, CA (US)

(73) Assignee: K&N Engineering, Inc., Riverside, CA (US)

( * ) Notice: Subject to any disclaimer, the term of this patent is extended or adjusted under 35 U.S.C. 154(b) by 175 days.

(21) Appl. No.: 15/879,304

(22) Filed: Jan. 24, 2018

(65) Prior Publication Data

US 2018/0209384 A1    Jul. 26, 2018

Related U.S. Application Data

(60) Provisional application No. 62/449,909, filed on Jan. 24, 2017.

(51) Int. Cl.
| | |
|---|---|
| *B01D 53/22* | (2006.01) |
| *F02M 35/024* | (2006.01) |
| *B01D 46/00* | (2006.01) |
| *B01D 46/52* | (2006.01) |
| *B01D 46/24* | (2006.01) |

(52) U.S. Cl.
CPC ... *F02M 35/02416* (2013.01); *B01D 46/0005* (2013.01); *B01D 46/2403* (2013.01); *B01D 46/521* (2013.01); *B01D 2275/206* (2013.01); *B01D 2279/60* (2013.01)

(58) Field of Classification Search
CPC .............. B01D 46/2403; B01D 46/521; B01D 46/0005; B01D 2279/60; F02M 35/02416
See application file for complete search history.

(56) References Cited

U.S. PATENT DOCUMENTS

| | | | | |
|---|---|---|---|---|
| 3,680,706 | A * | 8/1972 | Baer .................... | B01D 29/395 210/238 |
| 4,020,783 | A * | 5/1977 | Anderson .......... | B01D 46/2411 116/268 |
| 4,482,368 | A * | 11/1984 | Roberts .............. | B01D 46/0043 411/303 |
| 4,758,256 | A * | 7/1988 | Machado ........... | B01D 46/0005 210/232 |
| 5,064,458 | A * | 11/1991 | Machado ........... | B01D 46/0024 55/482 |

(Continued)

*Primary Examiner* — Anthony R Shumate
(74) *Attorney, Agent, or Firm* — Rutan & Tucker LLP; Hani Z. Sayed

(57) ABSTRACT

An air filter and methods are provided for optimizing filtration of an airstream passing through a volume within an air cleaner cover of an internal combustion engine. The air filter comprises a base plate that includes an inlet receiver for passing the airstream into an air inlet of the engine. A top plate comprises a receiver for fastening the air cleaner cover onto the air filter. Countersinks in the top plate and sleeves extending through the air filter facilitate fastening the air filter onto the air inlet of the engine. The air filter has a tapering height along a length of the air filter to maximize the total surface area of a filter medium within the volume between the air cleaner cover and the engine, and to take advantage of a relatively greater airflow due to a ram air opening in the air cleaner cover.

18 Claims, 4 Drawing Sheets

(56) References Cited

U.S. PATENT DOCUMENTS

| | | | | |
|---|---|---|---|---|
| 2002/0112459 A1* | 8/2002 | Andress | ............. | B01D 46/0024 |
| | | | | 55/498 |
| 2006/0006012 A1* | 1/2006 | Khouw | .................. | B60K 13/02 |
| | | | | 180/68.3 |
| 2014/0260144 A1* | 9/2014 | Williams | ........... | B01D 46/0005 |
| | | | | 55/502 |
| 2014/0260982 A1* | 9/2014 | Williams | ........... | B01D 46/2414 |
| | | | | 95/273 |
| 2015/0075123 A1* | 3/2015 | Carter | ................. | B01D 46/002 |
| | | | | 55/419 |
| 2015/0233327 A1* | 8/2015 | McClelland | ....... | B01D 46/2403 |
| | | | | 123/198 E |
| 2015/0275829 A1* | 10/2015 | Heck | .................... | F02M 35/086 |
| | | | | 95/281 |
| 2015/0314227 A1* | 11/2015 | Williams | ............. | F02M 35/024 |
| | | | | 95/281 |
| 2016/0082465 A1* | 3/2016 | Rosenbaum | ........ | B05B 11/3059 |
| | | | | 248/79 |
| 2016/0273423 A1* | 9/2016 | Williams | ........... | F01M 13/0011 |
| 2017/0122270 A1* | 5/2017 | Williams | ........... | B01D 46/0004 |

\* cited by examiner

SPACE OPTIMIZING AIR FILTER

PRIORITY

This application claims the benefit of and priority to U.S. Provisional Application, entitled "Space Optimizing Air Filter," filed on Jan. 24, 2017 and having application Ser. No. 62/449,909.

FIELD

The field of the present disclosure generally relates to air filter devices. More particularly, the field of the invention relates to an apparatus and a method for an air filter that optimizes filtration of air entering an available volume within an air cleaner cover of a small engine.

BACKGROUND

An air filter designed to remove particulate matter from an airstream generally is a device comprising fibrous materials. These fibrous materials may remove solid particulates such as dust, pollen, mold, and bacteria from the airstream. Air filters are used in applications where air quality is important, notably in building ventilation systems and with engines.

Air filters may be used in automobiles, trucks, tractors, locomotives, motorcycles, and other vehicles that use internal combustion engines. Air filters may be used with gasoline engines, diesel engines, or other engines that utilize fossil fuels or other combustible substances. Air filters may be used with engines in which combustion is intermittent, such as four-stroke and two-stroke piston engines, as well as other types of engines that take in air continuously such that a combustible substance may be burned. For example, air filters may be used with some gas turbines. Filters may also be used with air compressors and in other devices that relay on intake air.

Air filters for internal combustion engines prevent abrasive particulate matter from entering the engine's cylinders, where the particulate matter would cause mechanical wear and oil contamination. Such filters may be made from pleated paper, foam, cotton, spun fiberglass, or other known filter materials. Generally, however, air filters used with internal combustion engines and compressors are comprised of either paper, foam, or cotton filter materials. Some filters use an oil bath wherein particulate matter and contaminants are trapped in the oil. In many fuel injected engines, a flat panel pleated paper filter element may be used. A flat panel filter is usually placed inside a plastic air box connected to a throttle body of the engine by way of ductwork. Vehicles that use carburetors or throttle body fuel injection typically use a cylindrical air filter positioned above the carburetor or throttle body.

In many recreational applications, such as motorcycles, all-terrain vehicles, quads, quad bikes, three-wheelers, four-wheelers, quad cycles, and the like, the sizes of the engines generally are much smaller than the engines of trucks and automobiles. Consequently, free space near the relatively smaller engines of such vehicles carries a relatively higher premium, and thus the air boxes of small engines and the air filters they house generally are severely limited in size. As will be appreciated, however, an air filter generally provides a surface area through which to pass an airstream and entrap particulate matter and other contaminates so as to prevent them from entering into the air intake of the engine. Thus, a drawback to relatively small air filters is that they may become quickly clogged with debris due to their relatively small size. As the air filter becomes increasingly clogged with debris, air pressure within the air filter drops while the atmospheric air pressure outside the filter remains the same. Such a pressure differential gradually chokes the airstream through the air filter, hindering the ability of the air filter to protect the engine and degrading engine performance.

Another drawback to small air filters is that recreational vehicles and motorcycles frequently are operated in dirty, off-road conditions where optimal air filtration is of the utmost importance. What is needed, therefore, is an air filter that provides an optimized surface area for filtering an airstream and may be installed directly into the air boxes of small engines.

SUMMARY

An apparatus and a method are provided for a space optimizing air filter for optimizing filtration of an airstream passing through a volume within an air cleaner cover of an internal combustion engine. The air filter comprises a base plate that is configured to mount to an air inlet of the engine. The base plate comprises an inlet receiver that has an opening suitable for receiving the air inlet. A top plate is configured to receive the air cleaner cover. A receiver for the air cleaner cover is disposed in the top plate to facilitate fastening the air cleaner cover onto the air filter. A filter medium is disposed between the base plate and the top plate. Multiple countersinks in the top plate and sleeves extending through an interior cavity of the air filter are configured to facilitate fastening the air filter to the air inlet of the engine. The air filter has a height that tapers along a length of the air filter, from a maximal height at a front portion to a minimal height at a rear portion of the air filter. The degree of tapering of the height of the filter medium, as well as the values of the maximal filter height and the minimal filter height are configured to maximize the total surface area of the filter medium within the volume between the air cleaner cover and the engine to which the air filter is coupled. In some embodiments, the maximal filter height may be utilized to take advantage of a relatively greater airflow due to a ram air opening in the air cleaner cover.

In an exemplary embodiment, an air filter for optimizing filtration of an airstream passing through a volume within an air cleaner cover of an internal combustion engine comprises: a base plate configured to mount to an air inlet of the engine; a top plate configured to receive the air cleaner cover; and a filter medium disposed between the base plate and the top plate.

In another exemplary embodiment, the base plate is comprised of a recessed portion bounded by a peripheral edge that retains a lower portion of the filter medium, and wherein the top plate is comprised of a recessed portion bounded by a peripheral edge that retains a top portion of the filter medium. In another exemplary embodiment, the recessed portions are coupled with a wire support of the filter medium.

In another exemplary embodiment, the filter medium has a height that tapers along a length of the air filter, a maximal height being at a front portion of the air filter and a minimal height being at a rear portion of the air filter. In another exemplary embodiment, any one or more of the maximal height, the minimal height, and a degree of tapering of the height are configured to maximize the total surface area of the filter medium that is disposed between the air cleaner cover and the base plate. In another exemplary embodiment, the height of the air filter is substantially uniform along a width of the air filter. In another exemplary embodiment, the degree of tapering of the height depends upon the volume and shape of the air cleaner cover that will be fastened onto the air filter.

In another exemplary embodiment, the base plate comprises an inlet receiver that has an opening suitable for receiving the air inlet of the engine. In another exemplary embodiment, a curved portion comprising the inlet receiver is joined with the base plate and has a curvature configured to establish an air-tight coupling between the base plate and the air inlet.

In another exemplary embodiment, the inlet receiver has a configuration and a diameter that are suitable to accept the air inlet of the engine. In another exemplary embodiment, multiple countersinks are disposed in the top plate and configured to receive fasteners to mount the air filter onto the air inlet of the engine, each of the multiple countersinks being coupled with a sleeve that extends within an interior cavity of the air filter and through the base plate, the multiple countersinks and the sleeves being configured to receive fasteners suitable for mounting the air filter onto the air inlet such that an air-tight seal is established between the base plate and the air inlet. In another exemplary embodiment, the multiple countersinks and the sleeves are disposed in locations of the air filter that are aligned with existing threaded holes of the air inlet.

In another exemplary embodiment, a receiver for the air cleaner cover is disposed in the top plate to facilitate fastening the air cleaner cover onto the air filter. In another exemplary embodiment, the receiver extends above the top plate to a controlled height above the bottom of the base plate, the controlled height being selected to allow an interior surface of the air cleaner cover to contact a pliable seal disposed atop the recessed portion.

In an exemplary embodiment, a method for an air filter to optimize filtration of an airstream passing through a volume within an air cleaner cover of an internal combustion engine comprises: configuring a base plate to mount onto an air inlet of the engine; configuring a top plate to receive the air cleaner cover; and disposing a filter medium between the base plate and the top plate.

In another exemplary embodiment, configuring the base plate further comprises forming an inlet receiver that has an opening for receiving the air inlet of the engine. In another exemplary embodiment, configuring the top plate further comprises disposing multiple countersinks in the top plate and coupling each of the multiple countersinks with a sleeve that extends through the base plate, the multiple countersinks and sleeves being configured to receive fasteners to mount the air filter onto the air inlet of the engine. In another exemplary embodiment, the method further comprising forming a recessed portion in each of the base plate and the top plate to retain the filter medium. In another exemplary embodiment, the method further comprising tapering a height of the filter medium from a maximal height at a front portion to a minimal height at a rear portion of the air filter. In another exemplary embodiment, configuring the top plate further comprises disposing a receiver atop the top plate to facilitate fastening the air cleaner cover onto the air filter.

BRIEF DESCRIPTION OF THE DRAWINGS

The drawings refer to embodiments of the present disclosure in which.

Figure 1:
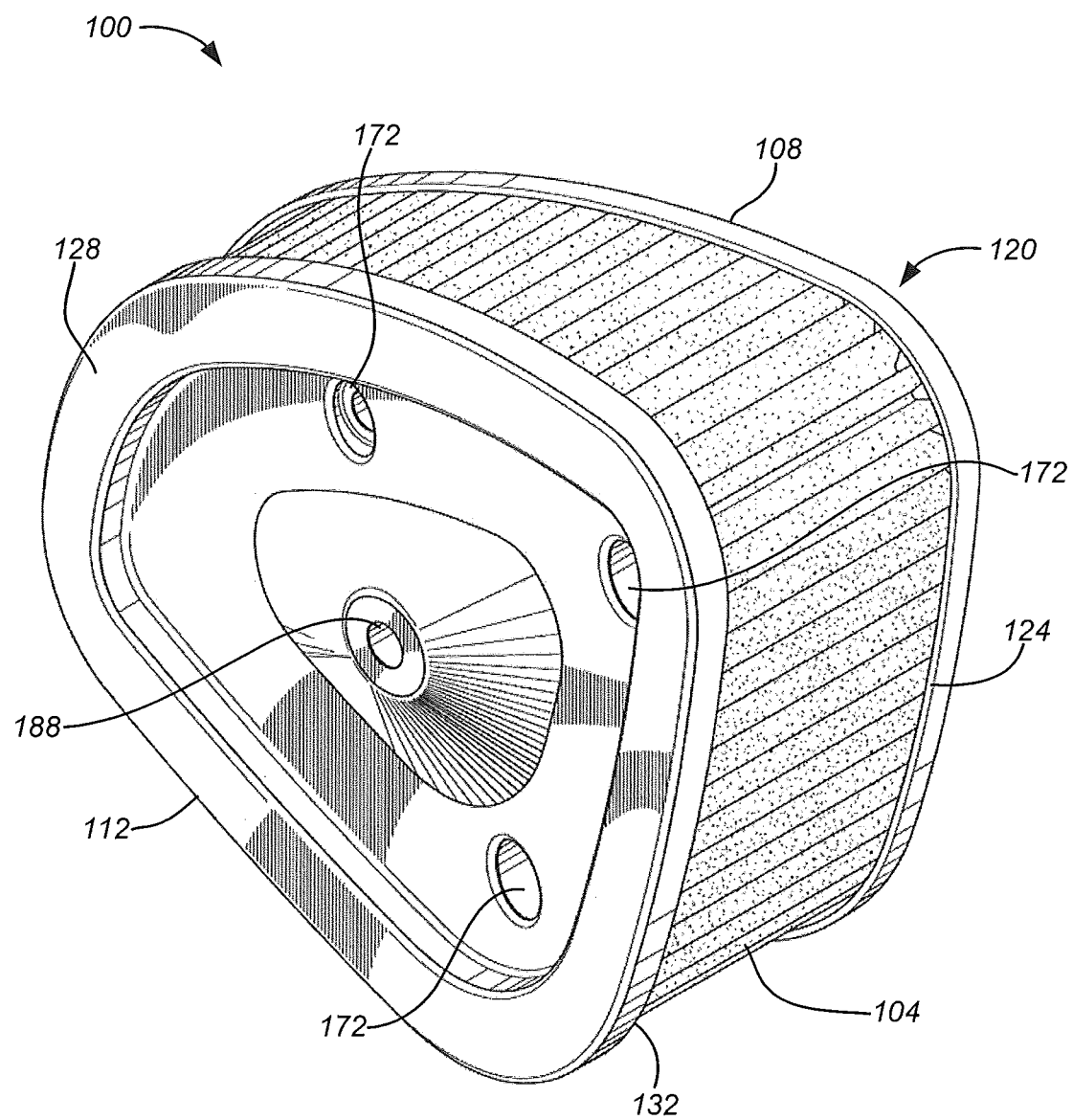
FIG. 1 illustrates an isometric view of an exemplary embodiment of a space optimizing air filter, in accordance with the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first filter," may be made. However, the specific numeric reference should not be interpreted as a literal sequential order but rather interpreted that the "first filter" is different than a "second filter." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Although embodiments of the present disclosure may be described and illustrated herein in terms of an air filter having a specific perimeter shape, it should be understood that embodiments of the present disclosure are not limited to the exact shape illustrated, but rather may include a wide variety of generally enclosed perimeter shapes, such as generally circular, cylindrical, round, curved, conical, polygonal, rhomboid, trapezoid, and the like, that provide a relatively large surface area in a given volume within an air cleaner or an air box.

In general, the present disclosure describes a space optimizing air filter and methods for optimizing filtration of an airstream passing through a volume within an air cleaner cover of an internal combustion engine. The air filter comprises a base plate that may be mounted to an air inlet of the engine. The base plate includes an inlet receiver that has an opening to receive the air inlet. A top plate includes a receiver configured to facilitate fastening the air cleaner cover onto the air filter. A filter medium is disposed between the base plate and the top plate. Multiple countersinks in the top plate and sleeves extending through an interior cavity of the air filter facilitate fastening the air filter onto the air inlet of the engine. The air filter has a height that tapers along a length of the air filter, from a maximal height at a front portion to a minimal height at a rear portion of the air filter. The maximal height, the minimal height, and the degree of tapering of the height may be configured to maximize the total surface area of the filter medium within the volume between the air cleaner cover and the engine to which the air filter is coupled.

FIG. 1 illustrates an isometric view of an exemplary embodiment of a space optimizing air filter 100 (hereinafter, "air filter 100"), in accordance with the present disclosure. The air filter 100 is configured to be mounted onto an internal combustion engine, so as to filter an airstream entering the engine, and receive an air cleaner cover (not shown) that directs the airstream into a filter medium 104 comprising the air filter. The filter medium 104 is retained between a base plate 108 and a top plate 112. The base plate 108 and the top plate 112 preferably are comprised of materials that are sufficiently durable and temperature resistant to retain their configuration during installation and operation when coupled with an air inlet of the internal combustion engine. In some embodiments, the base plate 108 and the top plate 112 may be coated with a corrosion resistant material, such as zinc or other suitable material, without limitation.

Figure 5:
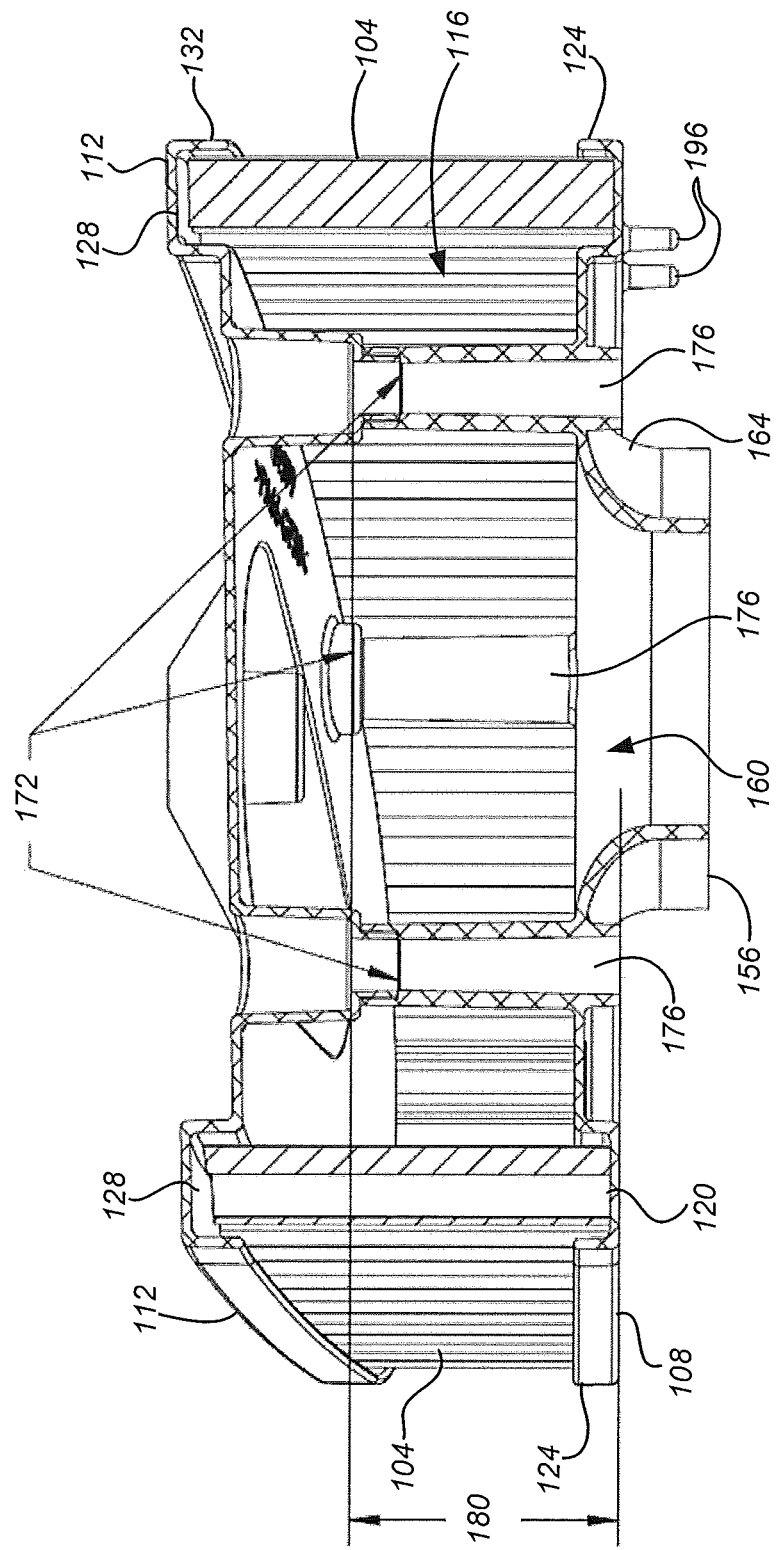
FIG. 5 is a cut-away view of the space optimizing air filter of FIG. 1, illustrating countersinks and sleeves extending through an interior cavity of the air filter.

As best illustrated in FIG. 5, the filter medium 104 generally surrounds an interior cavity 116 such that the filter medium 104 creates an exterior perimeter of at least a portion of the cavity. An exterior cross-sectional shape of the filter medium 104 may be suitably shaped so as to increase the surface area available for filtration of the airstream flowing into the volume within the air cleaner cover. The shape may be consistent along a height of the filter medium 104, extending from the base plate 108 to the top plate 112, or may vary along the height of the filter medium. In some exemplary embodiments, the outer profile may taper along the height of the filter medium 104.

The filter medium 104 generally provides an area to pass the airstream and entrap particulates and other contaminates flowing with the airstream. The filter medium 104 may be comprised of paper, foam, cotton, spun fiberglass, or other known filter materials, woven or non-woven material, synthetic or natural, or any combination thereof. The filter medium 104 may be pleated, or otherwise shaped, or contoured so as to increase a surface area for passing the airstream to be cleaned. The length of the filter medium 104 in the circumferential direction may be longer than the length of the perimeter of the air filter 100 generally, such that the surface area of the filter medium 104 is greater than the profile surface area of the air filter 100.

In some embodiments, the filter medium 104 may be comprised of 4 to 6 layers of cotton gauze sandwiched between two epoxy-coated aluminum wire screens. The cotton may be advantageously treated with a suitably formulated filter oil composition that causes tackiness throughout microscopic strands comprising the filter medium. The nature of the cotton allows high volumes of airflow, and when combined with the tackiness of the filter oil composition creates a powerful filtering medium that ensures a high degree of air filtration. Further details about components comprising the filter medium 104, as well as details about the filter oil composition, are disclosed in U.S. patent application Ser. No. 14/181,678, entitled "Air Box With Integrated Filter Media," filed on Feb. 16, 2014, and U.S. patent application Ser. No. 14/701,163, entitled "Filter Oil Formulation," filed on Apr. 30, 2015, the entirety of each of which is incorporated herein by reference.

As described above, the filter medium 104 is retained between the base plate 108 and the top plate 112. The base plate 108 is comprised of a recessed portion 120 bounded by a peripheral edge 124 that retains a lower portion of the filter medium 104. Similarly, the top plate 112 is comprised of a recessed portion 128 bounded by a peripheral edge 132 that retains a top portion of the filter medium 104. Any of a variety of fasteners may be used to affix the filter medium 104 within the recessed portions 120, 128. In some embodiments, the recessed portions 120, 128 may be molded onto a wire support of the filter medium 104. In some embodiments, the recessed portions 120, 128 may be crimped so as to fold onto and retain the wire support and the filter medium 104. Further, in some embodiments, any of various suitable adhesives may be used to adhere the wire support and filter medium 104 to the recessed portions 120, 128. It will be appreciated that by those skilled in the art that fastening or adhering the filter medium 104 to the base and top plates 108, 112 renders the filter medium 104 irremovable from the air filter 100.

Figure 2:
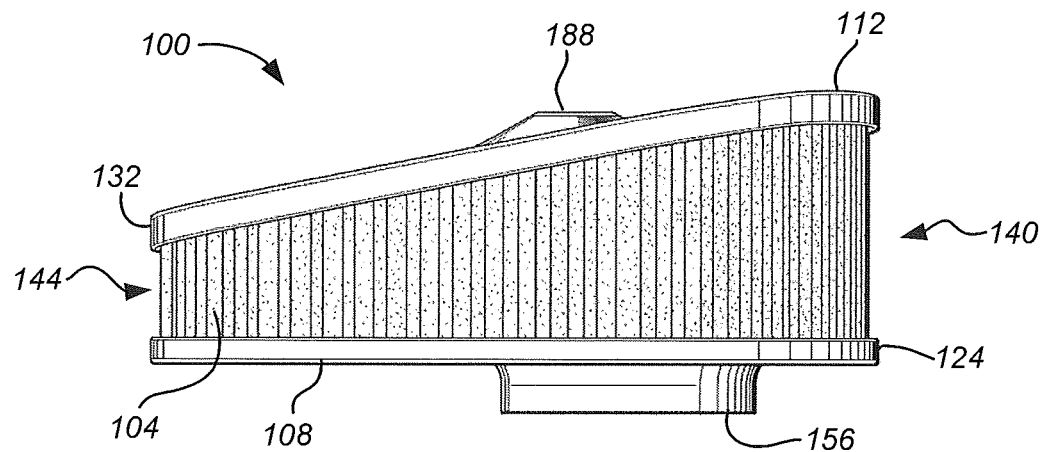
FIG. 2 is a side plan view of the space optimizing air filter of FIG. 1, illustrating a filter height that tapers from a front portion to a rear portion of the air filter.
Figure 3:
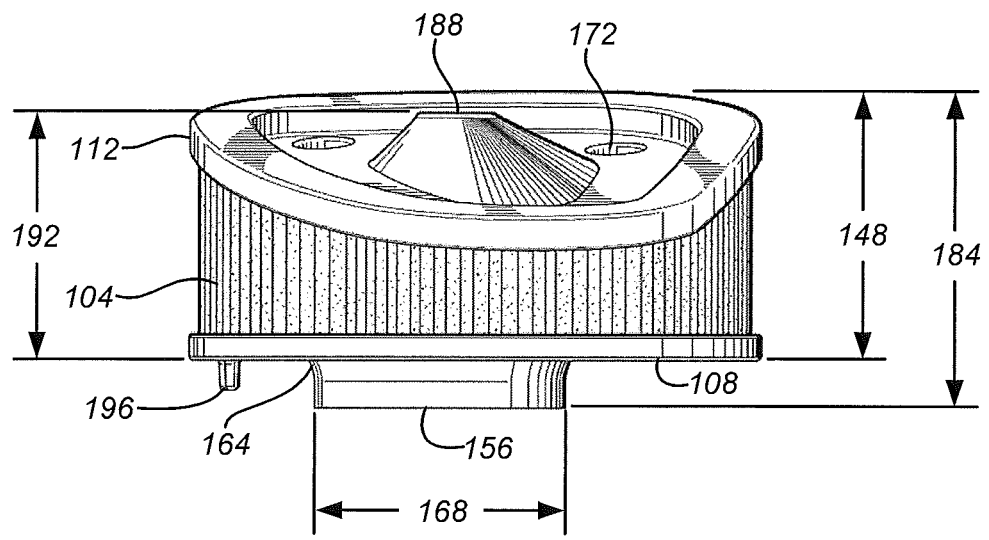
FIG. 3 is a rear plan view of the space optimizing air filter shown in FIG. 1, illustrating a total controlled height of the air filter.
Figure 4:
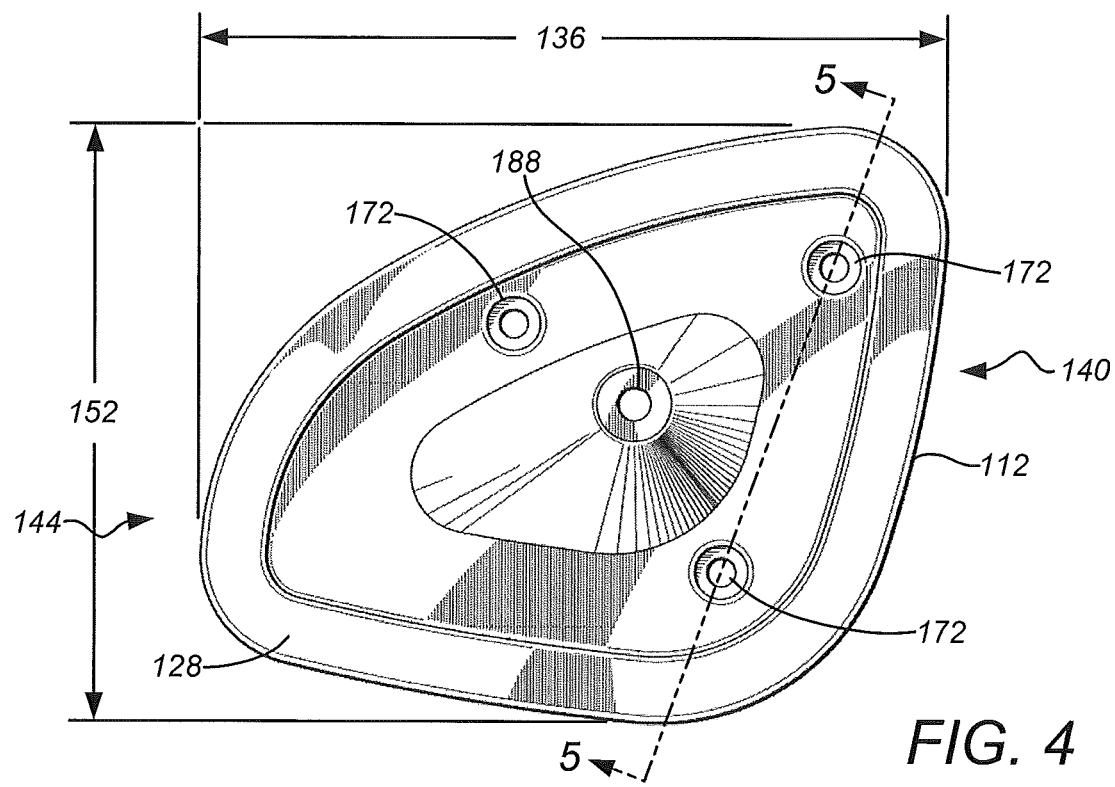
FIG. 4 is a top plan view of the space optimizing air filter of FIG. 1, showing a length and a width of the air filter.

As best illustrated in FIG. 2, the air filter 100 has a height that generally tapers along a length 136 (FIG. 4) of the air filter, extending from a front portion 140 to a rear portion 144 of the air filter. As such, the air filter 100 has a maximal filter height 148 at the front portion 140 and a minimal filter height at the rear portion 144, as shown in FIG. 3. The degree of tapering of the height of the filter medium 104, as well as the values of the maximal filter height 148 and the minimal filter height are configured to maximize the total surface area of the filter medium 104 that is disposed within the volume between the air cleaner cover and the engine to which the air filter 100 is coupled. It is contemplated that the maximal filter height 148 may be further utilized to take advantage of a relatively greater airflow due to a ram air opening in the air cleaner cover.

As best illustrated in FIG. 3, the height of the air filter 100 may be substantially uniform along a width 152 (FIG. 4) of the air filter. In some embodiments, however, the height of the air filter 100 may be configured to taper in either direction along the width 152 of the air filter. As will be appreciated, the degree of tapering of the height of the air filter 100 along the length and width 136, 152 generally depends upon the volume and shape of the air cleaner cover that will be fastened onto the air filter. As such, the height of the air filter 100 may be changed along either or both of the length and width 136, 152 of the air filter, without limitation.

Figure 4A:
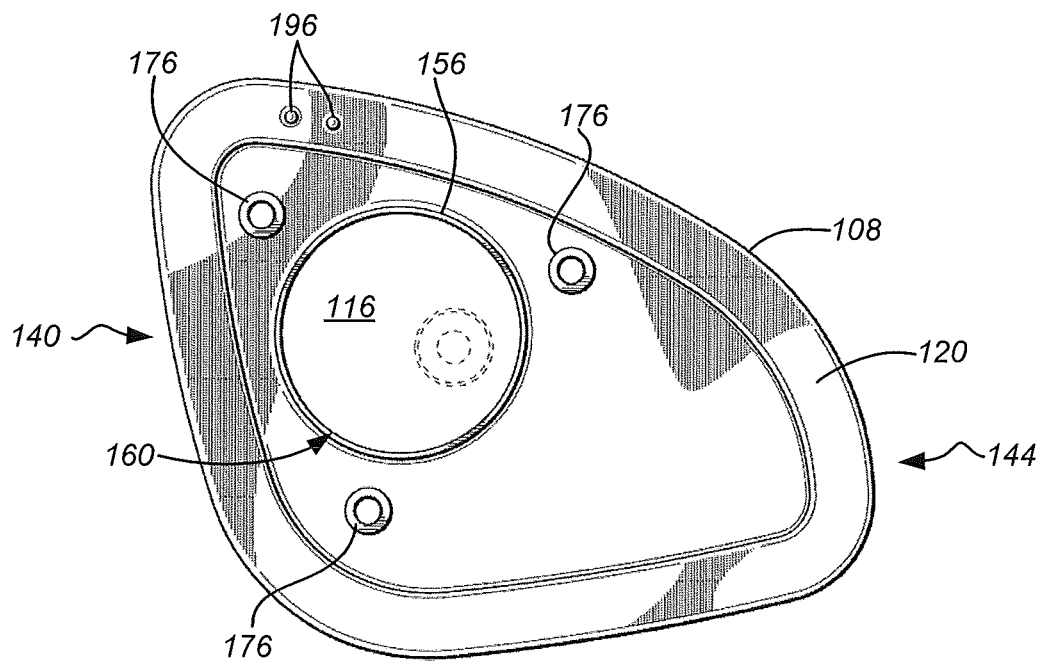
FIG. 4A is a bottom plan view of the space optimizing air filter of FIG. 1, showing an inlet receiver and interior cavity of the air filter.

With reference to FIGS. 4A and 5, the base plate 108 comprises an inlet receiver 156 that has an opening 160 suitable for receiving an air inlet of the internal combustion engine. A curved portion 164 comprising the inlet receiver 156 joins with the base plate 108. The curved portion 164 has a curvature that is critical for establishing an air-tight coupling between the base plate 108 and the air inlet of the engine. The inlet receiver 156 may be secured to the air inlet such that air is drawn through the filter medium 104 into the interior cavity 116 of the air filter 100 and then is conducted through the opening 160 into the air inlet of the engine. It should be appreciated that the inlet receiver 156 generally has a configuration and a diameter 168 (FIG. 3) that are suitable to accept the air inlet of the engine. For example, the inlet receiver 156 may comprise any of a variety of ridges or raised portions that are found to optimally engage the air inlet of the engine. The specific configuration of the inlet receiver 156 and the diameter 168 depend upon the particular make and model of the engine for which the air filter 100 is to be utilized, and thus a wide variety of configurations and diameters may be incorporated into the air filter 100 without limitation.

It is contemplated that a suitable gasket may be fastened between the base plate 108 of the air filter 100 and the air inlet of the engine, and that the curved portion 164 and the inlet receiver 156 may extend into an opening of the air inlet. Multiple countersinks 172 may be disposed in the top plate 112 and configured to receive fasteners that are configured to mount the air filter 100 onto the air inlet of the engine. As best illustrated in FIG. 5, each countersink 172 is coupled with a sleeve 176 that extends within the interior cavity 116 and through the base plate 108. The countersinks 172 and the sleeves 176 may be configured to receive fasteners suitable for mounting the air filter 100 onto the air inlet such that an air-tight seal is established between the base plate 108, the gasket, and the air inlet. As such, the countersinks 172 and the sleeves 176 preferably are disposed in locations of the air filter 100 that are aligned with existing threaded holes of the air inlet. In the illustrated embodiment of FIGS. 1-5, three countersinks 172 and sleeves 176 are incorporated into the air filter 100 as described herein. In some embodiments, however, the air filter 100 may be comprised of either more or less than three countersinks 172 and sleeves 176 that are disposed in different locations than illustrated herein, depending on the specific configuration of the engine and the air inlet which the air filter is to be coupled.

As shown in FIG. 5, the countersinks 172 extend into the interior cavity 116 to a depth positioned at a fastener controlled height 180 above the bottom of the base plate 108. The fastener controlled height 180 depends on the length of the particular fasteners that are intended to be used to fasten the air filter 100 onto the engine. As will be recognized, the length of the fasteners generally depends on a total height 184 (FIG. 3) of the air filter 100, and thus depends upon the configuration of the particular air cleaner cover that is intended to be fastened onto the air filter. In some embodiments, the fastener controlled height 180 may be configured to receive original manufacture equipment fasteners that are used to mount an original air filter onto the engine. In some embodiments, the fastener controlled height 180 may be configured to receive customized fasteners, without limitation.

Returning again to FIG. 1, a receiver 188 for the air cleaner cover may be centrally disposed in the top plate 112 to facilitate fastening the air cleaner cover onto the air filter 100. In the embodiment illustrated herein, the receiver 188 is comprised of a threaded hole configured to receive a threaded fastener, such as a bolt, that may be used to mount the air cleaner cover onto the air filter 100. In other embodiments, however, the receiver 188 may be configured to receive any of various suitable fasteners, without limitation. As shown in FIG. 3, the receiver 188 extends above the top plate 112 to a controlled height 192 above the bottom of the base plate 108. The controlled height 192 may be selected to position the air cleaner cover at a specific distance above the top plate 112 once the air filter 100 is mounted onto the engine. For example, the controlled height 192 may be selected to allow an interior surface of the air cleaner cover to contact a pliable seal disposed atop the recessed portion 128.

Turning, now, to FIGS. 3, 4A, and 5, the base plate 108 may include one or more vent receivers 196 that are configured to enable a practitioner of the air filter 100 to place any of various ventilation hoses coupled with the engine into fluid communication with the interior cavity 116 of the air filter. For example, the vent receivers 196 may be comprised of one or more flanges adapted to couple the interior cavity 116 with any of a PCV valve, a crankcase breather, and various sensors that are electrically connected with the engine. In some embodiments, the vent receivers 196 may be comprised of threaded fittings that are configured to accept threaded fittings coupled with the ventilation hoses. As will be appreciated, the number and configuration of the vent receivers 196 generally depend upon the particular engine for which the air filter 100 is to be utilized. It should be understood, therefore, that a wide variety of different configurations of the vent receivers 196 may be incorporated into various embodiments of the air filter 100 without limitation.

It is contemplated that a user of the air filter 100 may periodically clean the filter medium 104 rather than replacing the entire air filter 100, as is typically done with conventional air filter systems. In some embodiments, a method for cleaning the filter medium 104 comprises removing the air cleaner cover from the air filter 100, removing the air filter 100 from the air inlet of the engine, inserting a water hose through the opening 160 into the interior cavity 116, and spraying water so as to flush contaminants from the filter medium 104. In some embodiments, wherein the filter medium comprises a filter oil composition, a solvent may be used to remove the oil from the filter medium 104. Once the filter medium 104 is completely dry, a suitably formulated filter oil composition may be uniformly applied and allowed to wick into the filter medium. Further details about suitable filter oil compositions are disclosed in above-disclosed U.S. patent application Ser. No. 14/701,163, entitled "Filter Oil Formulation," filed on Apr. 30, 2015, which is incorporated herein by reference. Various other cleaning methods will be apparent to those skilled in the art without deviating from the spirit and scope of the present disclosure.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. An air filter, comprising:
a base plate configured to mount to an air inlet of an internal combustion engine, the base plate including a sleeve forming an opening in the base plate and extending inwardly;
a top plate configured to receive an air cleaner cover of the internal combustion engine, the top plate including a countersink forming an opening in the top plate and extending inwardly, wherein the sleeve and the countersink couple thereby forming an aperture that extends from the opening in the top plate to the opening in the base plate, wherein a first side of the top plate forms a first external side of the air filter; and a filter medium disposed between the base plate and the top plate.

2. The air filter of claim 1, wherein the base plate is comprised of a recessed portion bounded by a peripheral edge that retains a lower portion of the filter medium, and wherein the top plate is comprised of a recessed portion bounded by a peripheral edge that retains a top portion of the filter medium.

3. The air filter of claim 2, wherein the recessed portions are coupled with a wire support of the filter medium.

4. The air filter of claim 1, wherein the filter medium has a height that tapers along a length of the air filter, a maximal height being at a front portion of the air filter and a minimal height being at a rear portion of the air filter.

5. The air filter of claim 4, wherein the height of the air filter is substantially uniform along a width of the air filter.

6. The air filter of claim 4, wherein the degree of tapering of the height depends upon a volume and a shape of the air cleaner cover that will be fastened onto the air filter.

7. The air filter of claim 1, wherein the base plate comprises an inlet receiver that has an opening configured to receive the air inlet of the engine.

8. The air filter of claim 7, wherein a curved portion comprising the inlet receiver is joined with the base plate and is configured to establish an air-tight coupling between the base plate and the air inlet.

9. The air filter of claim 1, wherein a diameter of an opening of the inlet receiver is configured to accept the air inlet of the engine.

10. The air filter of claim 1, wherein multiple countersinks are disposed in the top plate and multiple sleeves are disposed in the bottom plate, the multiple countersinks and the multiple sleeves forming an air-tight seal between the base plate and the air inlet.

11. The air filter of claim 1, wherein the top plate includes an air cleaner cover receiver.

12. The air filter of claim 11, wherein the receiver extends above the top plate to a controlled height above the bottom of the base plate, the controlled height being selected to allow an interior surface of the air cleaner cover to contact a pliable seal disposed atop the recessed portion.

13. A method for assembling an air filter, comprising:
providing a base plate configured to mount to an air inlet of an internal combustion engine, the base plate including a sleeve forming an opening in the base plate and extending inwardly;
providing a top plate configured to receive an air cleaner cover of the internal combustion engine, the top plate including a countersink forming an opening in the top plate and extending inwardly, wherein the sleeve and the countersink couple thereby forming an aperture that extends from the opening in the top plate to the opening in the base plate, wherein a first side of the top plate forms a first external side of the air filter; and
providing a filter medium disposed between the base plate and the top plate.

14. The method of claim 13, wherein the base plate includes an inlet receiver that has an opening the air inlet of the engine.

15. The method of claim 13, wherein the top plate includes multiple countersinks disposed therein and the bottom plate includes multiple sleeves.

16. The method of claim 13, wherein each of the base plate and the top plate includes a recessed portion, wherein the recessed portion retains the filter medium.

17. The method of claim 13, further comprising tapering a height of the filter medium from a maximal height at a front portion to a minimal height at a rear portion of the air filter.

18. The method of claim 13, wherein configuring the top plate further comprises disposing a receiver atop the top plate.

* * * * *